US007757299B2

(12) United States Patent
Robert et al.

(10) Patent No.: US 7,757,299 B2
(45) Date of Patent: **\*Jul. 13, 2010**

(54) CONDITIONAL ACCESS TO DIGITAL RIGHTS MANAGEMENT CONVERSION

(75) Inventors: Arnaud Robert, Redmond, WA (US); Thaddeus C. Prichett, Edmunds, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/343,210

(22) Filed: Dec. 23, 2008

(65) Prior Publication Data

US 2009/0106850 A1 Apr. 23, 2009

Related U.S. Application Data

(63) Continuation of application No. 10/779,248, filed on Feb. 13, 2004, now Pat. No. 7,546,641.

(51) Int. Cl.
*H04L 9/32* (2006.01)

(52) U.S. Cl. .......................................... 726/30; 713/193
(58) Field of Classification Search ........................ None
See application file for complete search history.

(56) References Cited

U.S. PATENT DOCUMENTS 5,990,883 A 11/1999 Byrne
7,299,362 B2 * 11/2007 Shen et al. .................. 713/189

2003/0051149 A1 3/2003 Robert
2003/0126086 A1 7/2003 Safadi

FOREIGN PATENT DOCUMENTS

WO 2003039155 5/2003

OTHER PUBLICATIONS

Gassan Chaddoud, et al., "A Secure SSM Architecture", 10th IEEE International Conference on Networks, Aug. 2002, pp. 343-348.
Patrick Mannion, "Last Digital-TV Issues Get Resolved as Industry Gears Up for Prime Time", Electronic Design, vol. 48, Issue No. 8, Apr. 17, 2000, pp. 85-97.
Hyeonjeong Mun, et al., "A Digital Content Management Model for Making Profits in Digital Content Sites," Proceedings: 5th International Conference on Asian Digital Libraries, ICADL 2002, Singapore, Dec. 11-14, 2002, pp. 516-517.
Dalit Naor and Moni Naor, "Protecting Cryptographic Keys: The Trace-and-Revoke Approach", IEEE Computer Society, vol. 36, Issue No. 7, Jul. 2003, pp. 47-53.

(Continued)

*Primary Examiner*—Brandon S Hoffman
(74) *Attorney, Agent, or Firm*—Workman Nydegger

(57) ABSTRACT

The present invention provides for an interface between two seemingly incompatible and different content protection systems. Accordingly, protected content may be transferred between the respective security kernels of a conditional access (CA) and digital rights management (DRM) systems, while maintaining security of the content and any associated protection information. The transfer and consumption of protected content and the associated content protection information may be achieved by temporarily or permanently binding the respective security kernels of the CA and DRM systems, transcribing content protection information, and potentially transcribing the content.

20 Claims, 11 Drawing Sheets

OTHER PUBLICATIONS

Brian Smith, "Fort TV", IEEE Spectrum, vol. 40, Issue 5, May 2003, pp. 30-32.

Changsheng Xu and David Dagan Feng, "Web-Based Protection and Secure Distribution for Digital Music", Proceedings: International Conference, Internet and Multimedia Systems and Applications, Honolulu, Hawaii, Aug. 13-16, 2001, pp. 102-107.

Gildred, J., et al., "Protected Entertainment Rights Management (PERM)", Network Working Group, Internet Draft, Feb. 3, 2004.

Eskicioglu, Ahmet M.; Town, John; and Delp, Edward J., Security for Digital Entertainment Content from Creation to Comsumption; Signal Processing Image Communication, Apr. 2003.

Office Action dated Feb. 19, 2008 cited in U.S. Appl. No. 10/779,278.

Notice of Allowance dated Oct. 10, 2008 cited in U.S. Appl. No. 10/779,248.

* cited by examiner

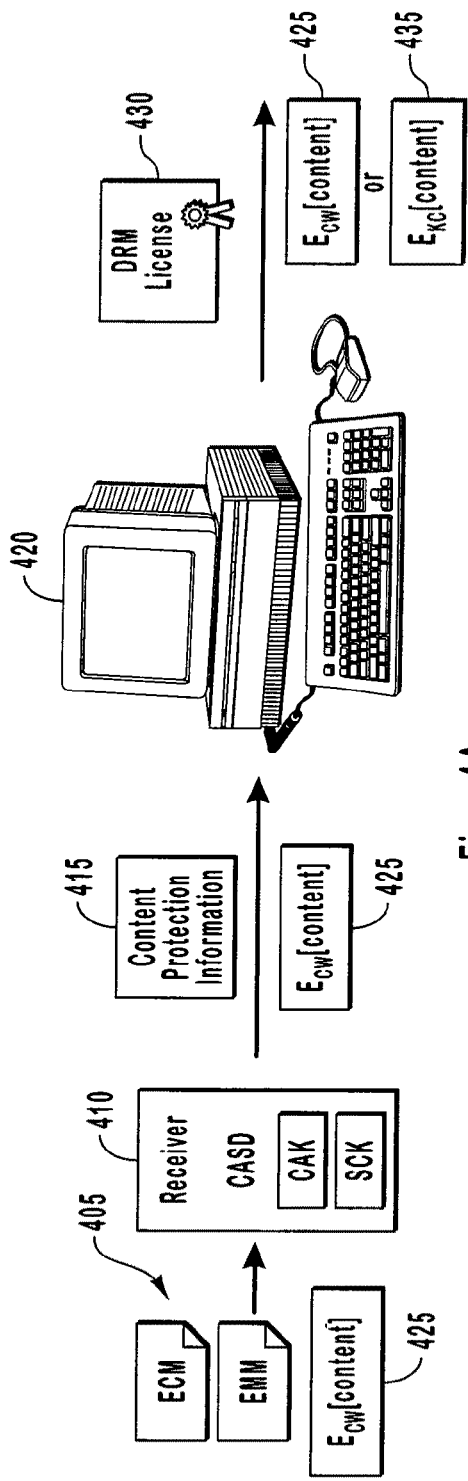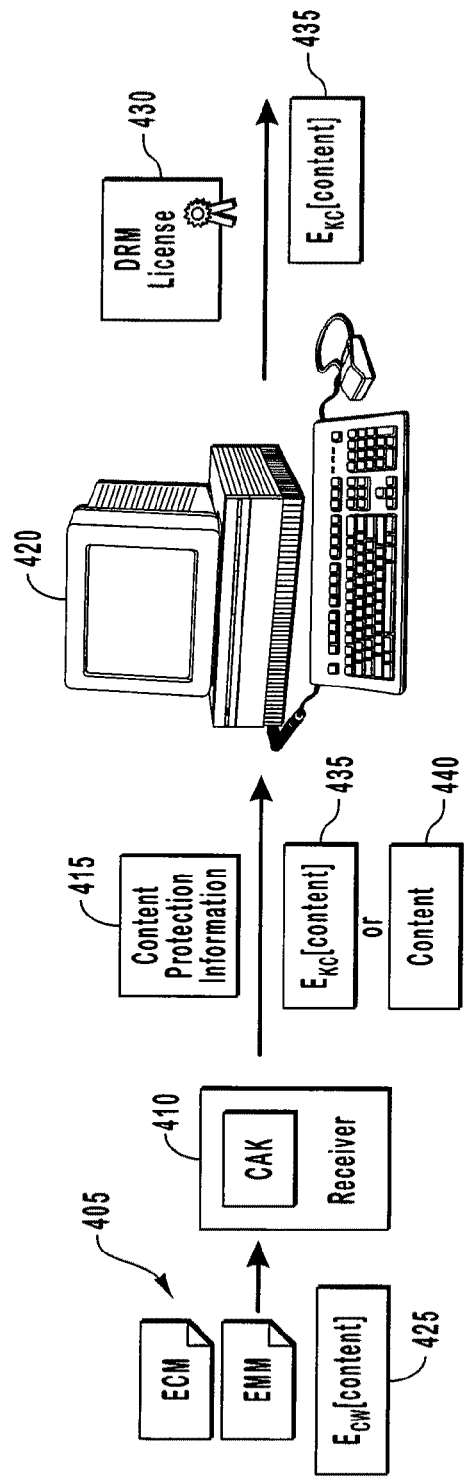

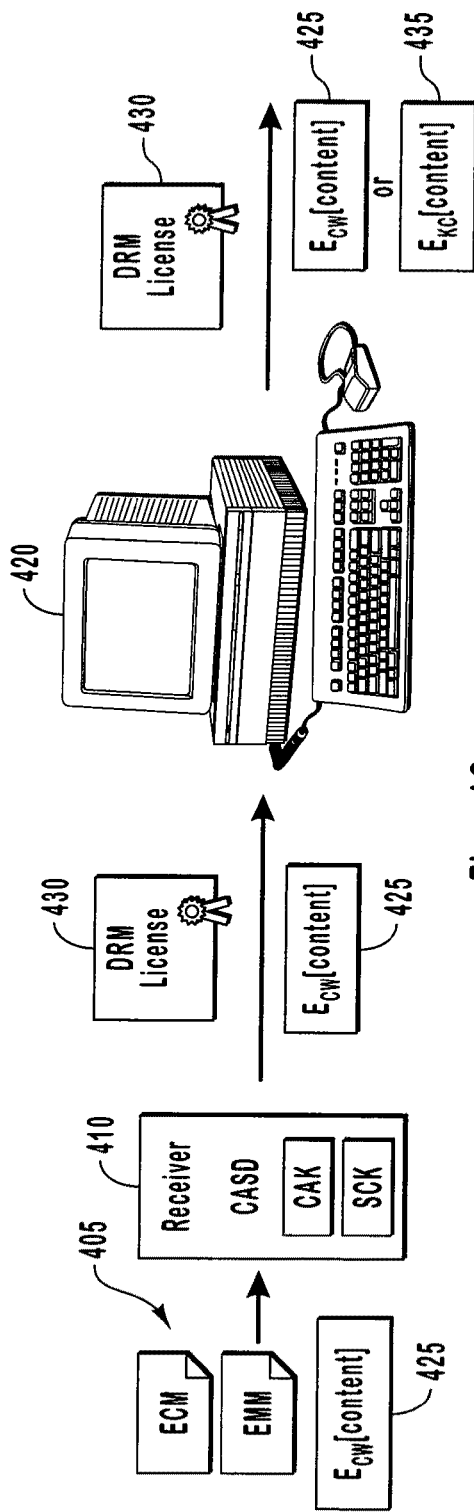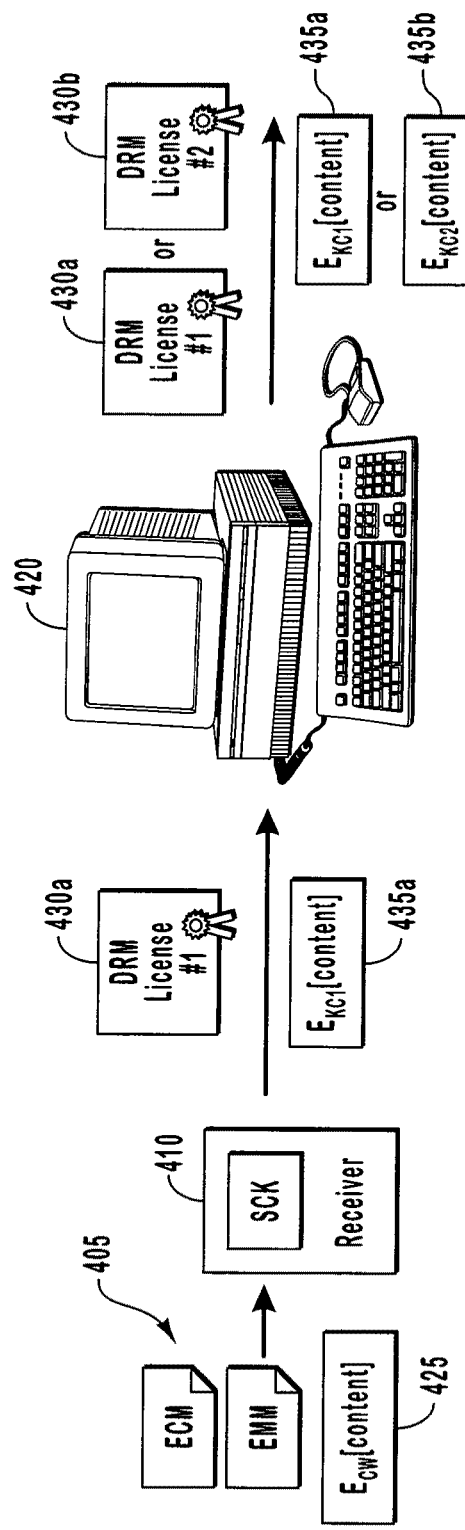
Fig. 4C
Fig. 4D

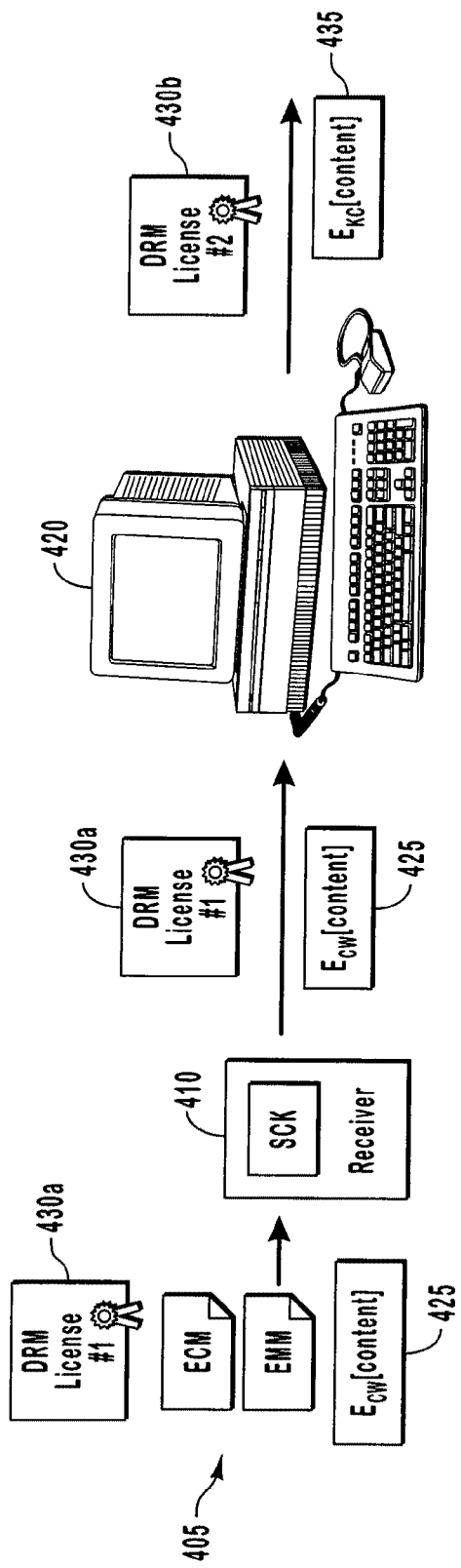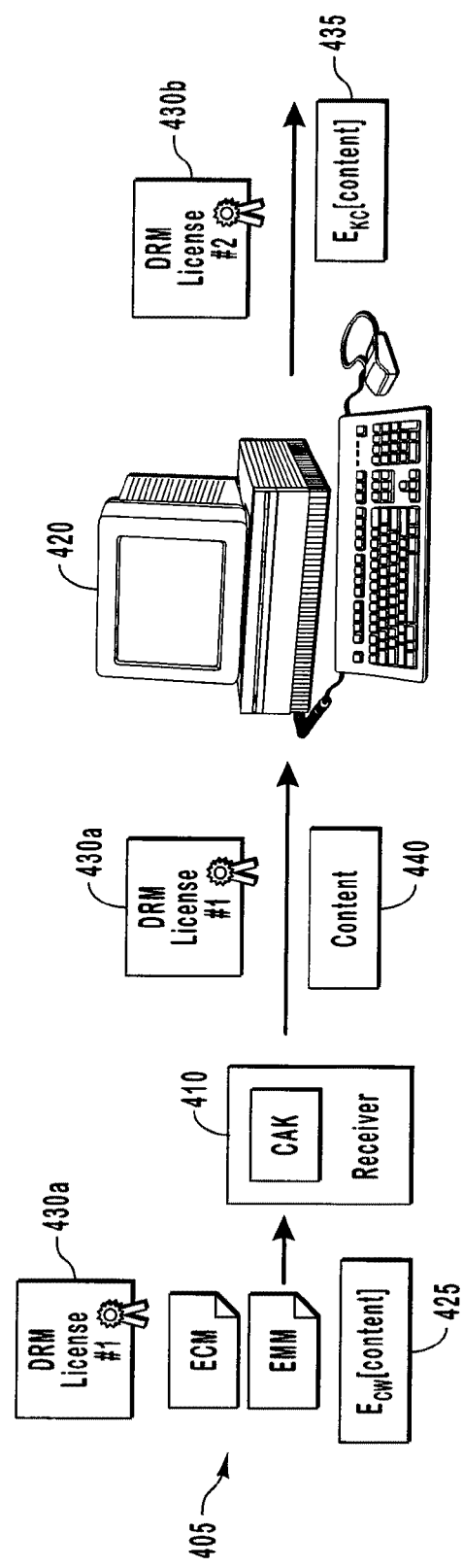

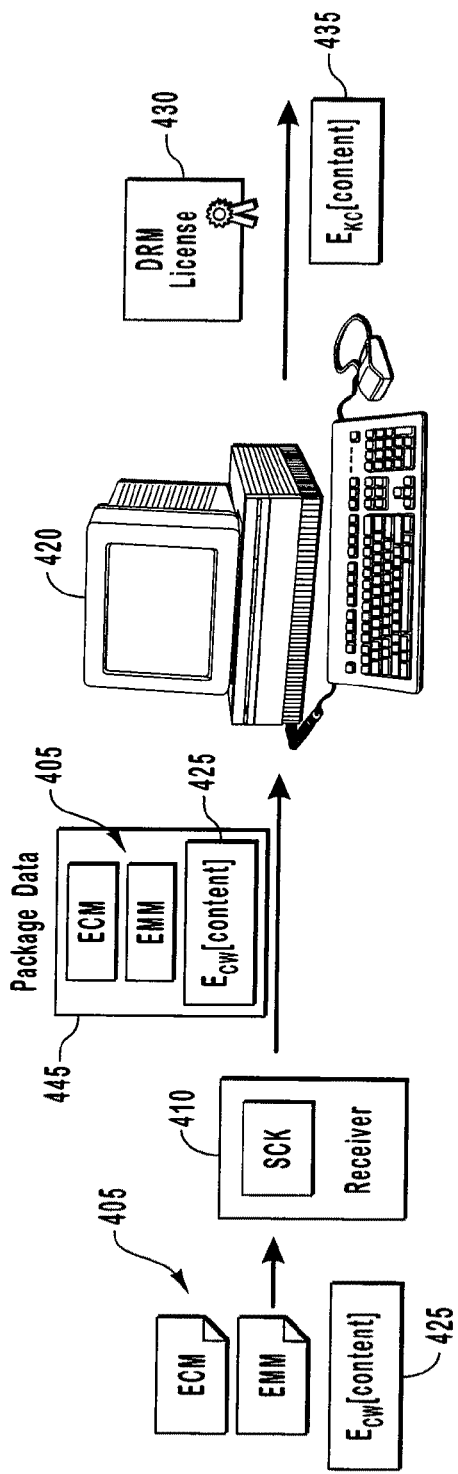
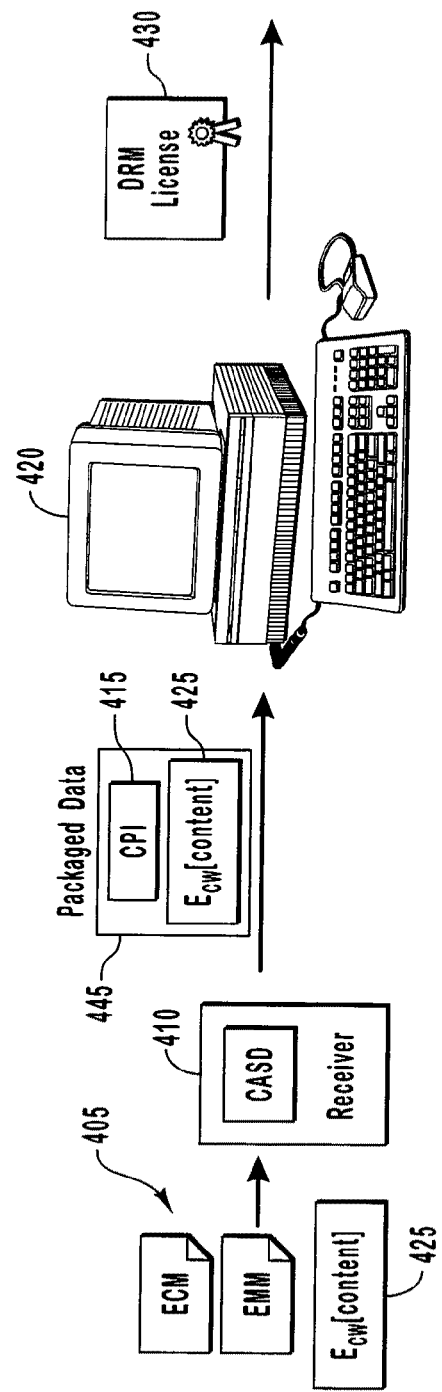
Fig. 4K
Fig. 4L

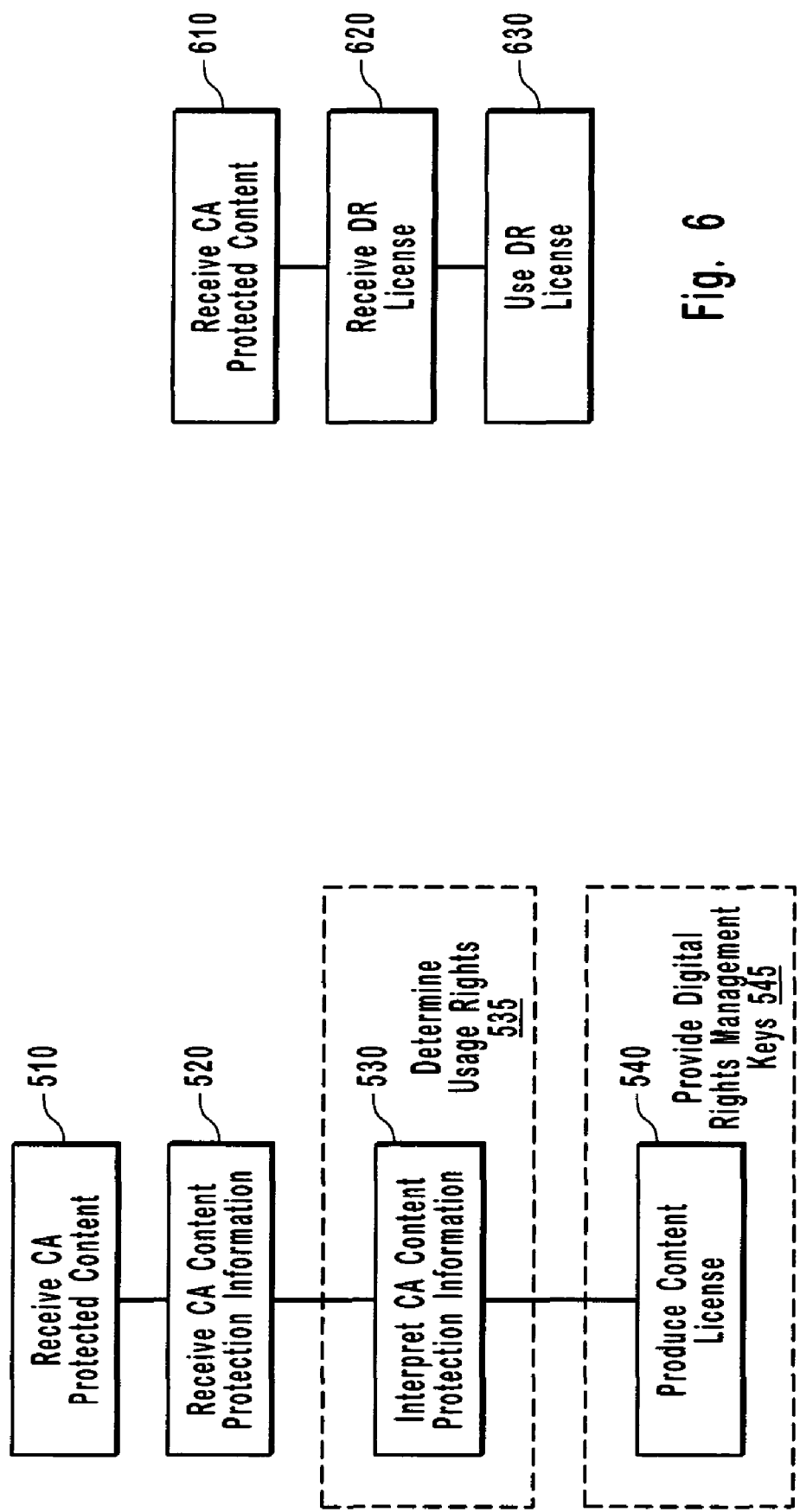

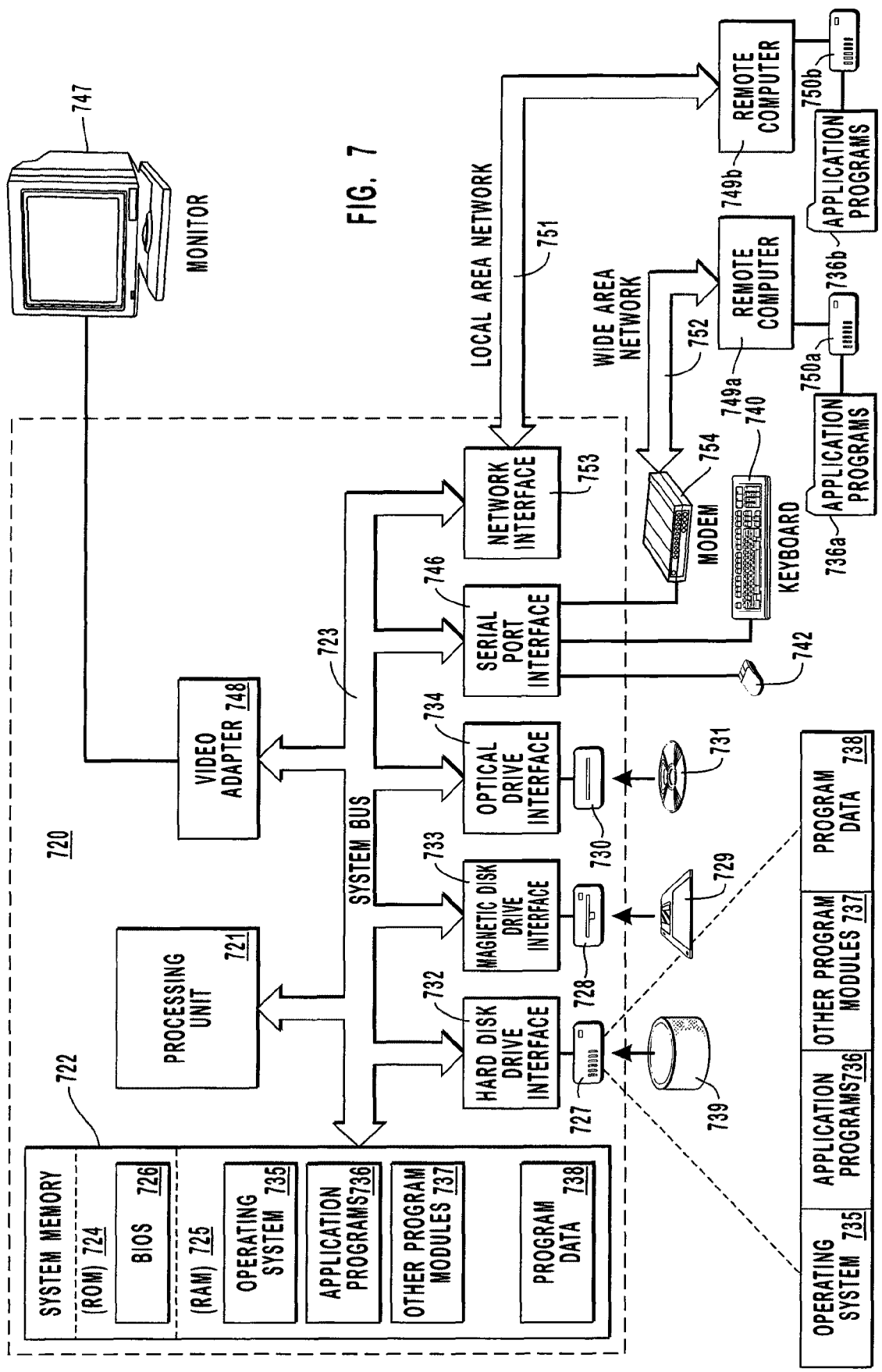

CONDITIONAL ACCESS TO DIGITAL RIGHTS MANAGEMENT CONVERSION

CROSS-REFERENCE TO RELATED APPLICATIONS

This Application is a continuation of, and claims the benefit of and priority to, U.S. application Ser. No. 10/779,248 (now U.S. Pat. No. 7,546,641), filed on Feb. 13, 2004, and entitled "CONDITIONAL ACCESS TO DIGITAL RIGHTS MANAGEMENT CONVERSION," which is expressly incorporated herein by this reference.

BACKGROUND OF THE INVENTION

1. The Field of the Invention

The present invention generally relates to interfacing two different content protection schemes. More particularly, the present invention provides producing a digital rights management license for consuming protected content that originated from a conditional access scheme, while maintaining security of the content and any associated content protection information.

2. Background and Related Art

Growing concerns over the distribution of copyrighted content (such as audio, video, text, data, multi-media, etc.) over a wide range of media (e.g. magnetic disks, magnetic tape, optical disk, satellite, cable, terrestrial, etc.) has led to a number of diverse content protection methods. Generally these schemes are designed to protect content during transit as well as after the content has been received (e.g. at a set top box, personal computer, television, mobile phone, etc.). Two common types of protection schemes include conditional access (CA) and digital rights management (DRM) systems.

Conditional access (CA) systems (which are described in greater detail below, for example, with regard to FIGS. 2 and 3) are used in broadcast platforms to securely deliver content from a service operator, such as a satellite or cable provider, to individual receivers. Most network operators will scramble at least some of their services in order to protect their pay-TV operations. Conditional access systems utilize security principles that include the encrypted data as well as two additional types of data known as CA messages (CAM), which are typically broadcast in the transport stream along with, or in parallel with, the scrambled program. CAMs consist of two separate and independent messages streams, one that includes a set of intermittent and continually updated encryption keys and the other that includes the subscriber rights to view a specific program. Both CA messages include the associated access conditions.

In contrast to CA systems for broadcast delivery of content (and as described in greater detail below, for example, with regard to FIGS. 2 and 3), DRM systems have been developed to securely allow consumption of other types of content (e.g., CDs, MPEG files, DVDs, audio/video streams, etc.) on devices such as personal computers and other electronic items. Rather than the multitude of intermittently updated keys and the multiple message streams used in CA schemes, DRM systems typically use a single license that includes the content usage rights as well as a decryption key for consuming the protected content. Further, the license can be delivered independent of the content, yet bind the content to the license and to a particular device or potentially a group of devices.

CA and DRM technologies were developed for protecting different types of content with different delivery mechanisms, and thus with different security risks in mind. For example, CA protection systems were developed for pay-TV media that is broadcast of to a plurality of devices in a streaming fashion, i.e., real time playback. Accordingly, because the content is broadcast and streamed, the various levels of protection (such as the intermittent updated keys and encryption thereof at different times and concealed in different messages) were considered important, possible, and practical.

On the other hand, DRM systems were developed for sending a single piece of content (i.e., not necessarily a real time broadcast, but digital data that can be stored and subsequently played/consumed) to typically a single device (or small group of devices). Accordingly, the binding of the content to a single license and binding the license to a particular device (or group of devices) provides an appropriate level of protection which is somewhat tailored to how the content is received and consumed.

Emerging network technology, e.g. home networking, however, is beginning to expose current incompatibilities between these alternative content protection methods. In particular, the desire to make all (or at least most) appliances and other devices within a home capable of communicating with one another, and being able to utilize the unique capabilities of each devices on any device within the home network, make unifying these two content protection systems advantageous.

BRIEF SUMMARY OF THE INVENTION

In accordance with exemplary embodiments of the present invention, the above-identified desire for interfacing two different protection schemes is achieved. For example, the present invention provides an entertainment media environment capable of translating one content protection scheme into a different content protection scheme. In particular, the present invention provides for methods, systems and computer program products that produce a content license used to consume content in accordance with usage rights defined by a content protection scheme, although the content originated from a different content protection scheme.

Example embodiments provide for receiving conditional access-protected content broadcast to a plurality of receivers and encrypted by a plurality of intermittent updated keys. Conditional access content protection information is also received that includes information used to determine, manage and enforce usage rights associated with the conditional access protection content. The conditional access content protection information is interpreted for determining the usage rights defined by the content provider, which specify how and under what conditions content may be consumed at a destination device. Based on the interpreted conditional access content protection information, a content license is produced and used for enforcing digital rights within the destination device by providing one or more digital rights management keys in accordance with the usage rights.

Other example embodiments provide for an entertainment media environment that receives conditional access-protected content broadcast to a plurality of receivers and encrypted by a plurality of intermittent updated keys. A digital rights license is received and includes information that specifies how and under what conditions the conditional access-protected content may be consumed at a destination device. The digital rights license also includes at least a portion of the plurality of intermittent updated keys. The conditional access-protected content may then be decrypted using the digital rights license at a destination device that uses a digital rights protection scheme to consume content.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 4A-L illustrate various implementations of translating from conditional access content protection scheme to a digital rights management content protection scheme in accordance with example embodiments;

FIG. 5 shows example acts and steps for methods of producing a content license in accordance with example embodiments;

FIG. 6 shows example acts for methods of using a digital rights license to consume conditional access protected content in accordance with example embodiments of the present invention; and FIG. 7 illustrates an example system that provides a suitable operating environment for the present invention.

DETAILED DESCRIPTION OF THE PREFERRED EMBODIMENTS

The present invention extends to methods, systems and computer program products for producing a content license used to consume content in accordance with usage rights defined by a content protection scheme different from the originating content protection scheme. The embodiments of the present invention may comprise a special purpose or general-purpose computer including various computer hardware, as discussed in greater detail below.

Example embodiments provide for methods, systems and computer program products for achieving the above-identified desire for interfacing two different protection schemes. In particular, because of the desire for sharing information between different devices within a home network, the present invention provides for the transfer of protected content between the respective security kernels of a conditional access (CA) and digital rights management (DRM) systems, while maintaining security of the content and any associated protection information. In the following description, content protection information (CPI) will be used as a generic term to comprise any information used to determine, manage or enforce usage rules associate with the content. More particularly, CPI will refer to content encryption keys, usage rights, licensing terms, access conditions, other security keys, and any other information useful to the protection of the content. The transfer and consumption of protected content and the associated content protection information may be achieved by temporarily or permanently binding the respective security kernels of the CA and DRM systems, transcribing the content protection information, and potentially transcribing the content.

Figure 1:
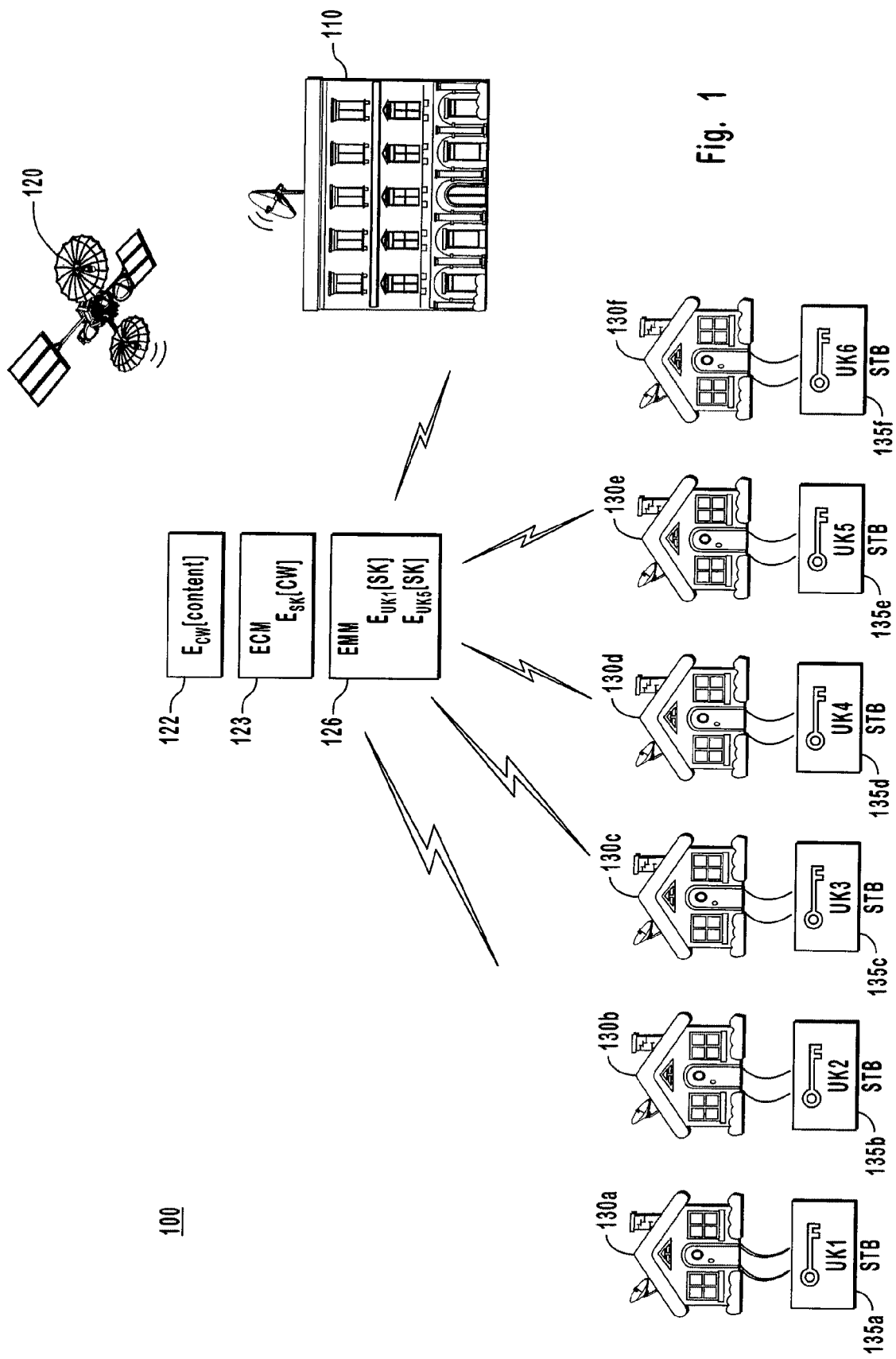
FIG. 1 illustrates an example of a typical conditional access content protection scheme.

FIG. 1 illustrates a typical CA system 100 wherein a network operator 110 wishes to scramble at least some of their services in order to protect their pay-TV or other operations. This means, of course, that the receivers shown here as set top boxes (STB) 135a-f will contain some descrambling software for accessing these services. The scrambled or encrypted content 122 is broadcast in a transport stream via any one of several broadcast means, e.g. satellite, cable, terrestrial, etc. (shown here as satellite system 120) and received by users 130a-f. Accordingly, the same information is received by all users 130a-f; however, without the appropriate keys as described below unauthorized users will be unable to decrypt the protected content 122.

In addition to the encrypted content 122, the CA system adds two types of data to the transport stream. These are known as CA messages (CAM), and consist of entitlement control messages (ECM) 123 and entitlement management messages (EMM) 126. Together, these control the ability of individual users 130a-f (or groups of users) to watch protected content. The encryption (and decryption) process relies on three pieces of information: (1) the control word; (2) the service key; and (3) the user key.

The control word (CW) is encrypted using the service key (SK), providing the first level of encryption. This SK may be common to a group of users, and typically each encrypted service will have one SK. This encrypted CW is broadcast in an ECM 123 approximately once every two seconds, and is what the decoder or receiver 135a-f actually needs to descramble a service.

Next, broadcaster or network operator needs to ensure that only authorized users (i.e., those who have paid) can decrypt the CW. To do this, the SK is itself encrypted using the user key (UK), e.g. UK1-6. Each user key is unique to a single user, and so the service key must be encrypted with the UK for each user that is authorized to view the content. Once the SK is encrypted, it is broadcast as part of an EMM 126. Since there is a lot more information to be broadcast (i.e., the encrypted SK must be broadcast for each authorized user), these are broadcast less frequently than the ECM 123. The following provides an example of the aforementioned CA process.

Encrypted content 122 and CAM messages, which consist of ECM 123 and EMM 126, are broadcast from network provider 110 via satellite 120 to a multitude of users 130a-f. Encrypted content 122 is encrypted using a control word (CW), which is subsequently encrypted using a service key (SK) and broadcast in the transport stream in an ECM 123. An EMM 126 is also broadcast in the transport stream, which includes the SK encrypted to the user key (UK) for those authorized users who have paid for the service. For example, as shown in FIG. 1 users 130a and 130e have paid for the service from the network provider 110, and therefore the SK has been encrypted using UK1 and UK5, corresponding to users keys for 130a and 130e, respectively, and included in the EMM 126. Accordingly, even though all users 130a-f receive the same broadcast signal, only receivers 135a and 135e will be able to decrypt the SK, and subsequently use the SK to decrypt the CW, which can then be used to decrypt the protected content 122.

Figure 2:
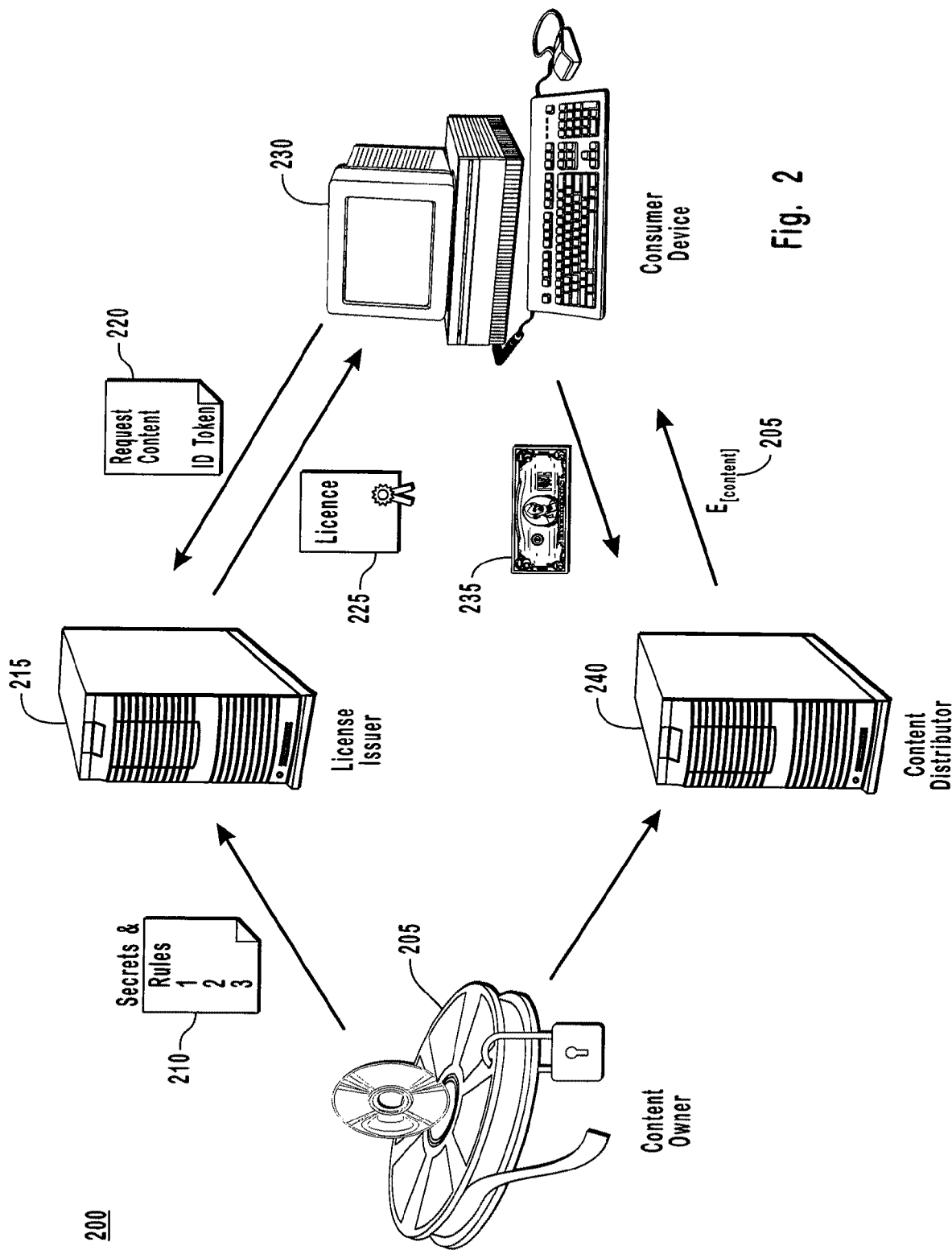
FIG. 2 illustrates an example of a typical digital rights management system content protection scheme.

In contrast to the aforementioned CA system, DRM systems use a different process for encrypting and decrypting protected content. FIG. 2 illustrates an example of a DRM system 200, which allows a content owner to distribute protected content 205 to a device 230. In general, the licensing process is initiated by the content owner encrypting content and packaging and distributing the content to consumers via the Internet, CD or other conventional means. Consumers may then receive a license for consuming the content in accordance with the business rules 210 defined by the content owner. The following describes a typical process for how a license 225 is received and used in order to decrypt protected content 205 in the DRM model.

Content owner usually encrypts and packages the content 205 in accordance with any number of well-known processes. Typically, however, the content will be packaged to include the encrypted content 205 and a header portion that includes information to assist a device 230 in consuming the content. Further, the packaged content may use a license acquisition URL to point to a location where a license 225 may be acquired. Moreover, there is a number of other optional and important data which may be included within the packaged file, e.g. private signing key used to sign the content header, license key seed used to generate the key that is shared between the content owner and license issuer, etc.

The protected content 205 may be sent to a content distributor 240 and placed on a web server or streaming server for distribution. Devices 230 receiving the content may then be directed to the license acquisition URL that is embedded within the header of the file to acquire the appropriate license 225 for consuming content 205. Before license 225 can be distributed by license issuer 215, the content owner must send to the license issuer 215 the business rules and sharing of secrets 210, which typically include the seed, public key and the business rules by which a license 225 will be granted. The rules 210 define how and under what conditions licenses may be distributed to users. For example, the rules may allow for the distribution of digital content to be played only a limited number of times, only for a certain total time, only on a certain type of machine, only on a certain type of media player, only by a certain type of user, etc. In any event, the license issuer 215 should be trusted in order to ensure that licenses 225 are issued in accordance with the appropriate business rules or requirements 210 as specified by the content owner.

Device 230 may obtain the content 205 from the content distributor 240 after paying such consideration 235 as defined by the content owner when the content 205 is sent to the content distributor 240. As previously mentioned, in order to play the encrypted content 205 the device 230 must first obtain a license 225 from the license issuer 215. Device 230 may use the license acquisition URL within the header of the encrypted content 205 to determine who the license issuer 215 is in order to make a request 220 for a license 225. A request process may then be initiated, which includes exchanging the content header, information about the client computer 230 and other optional information. Based on the information received, the license issuer 215 responds with an appropriate license 225 allowing device 230 to consume the encrypted content 205. This license 225 will typically include only a single encrypted key (KC) to decrypt the content, the specified rights, information about the device 230 and other content protect ion information.

Figure 3:
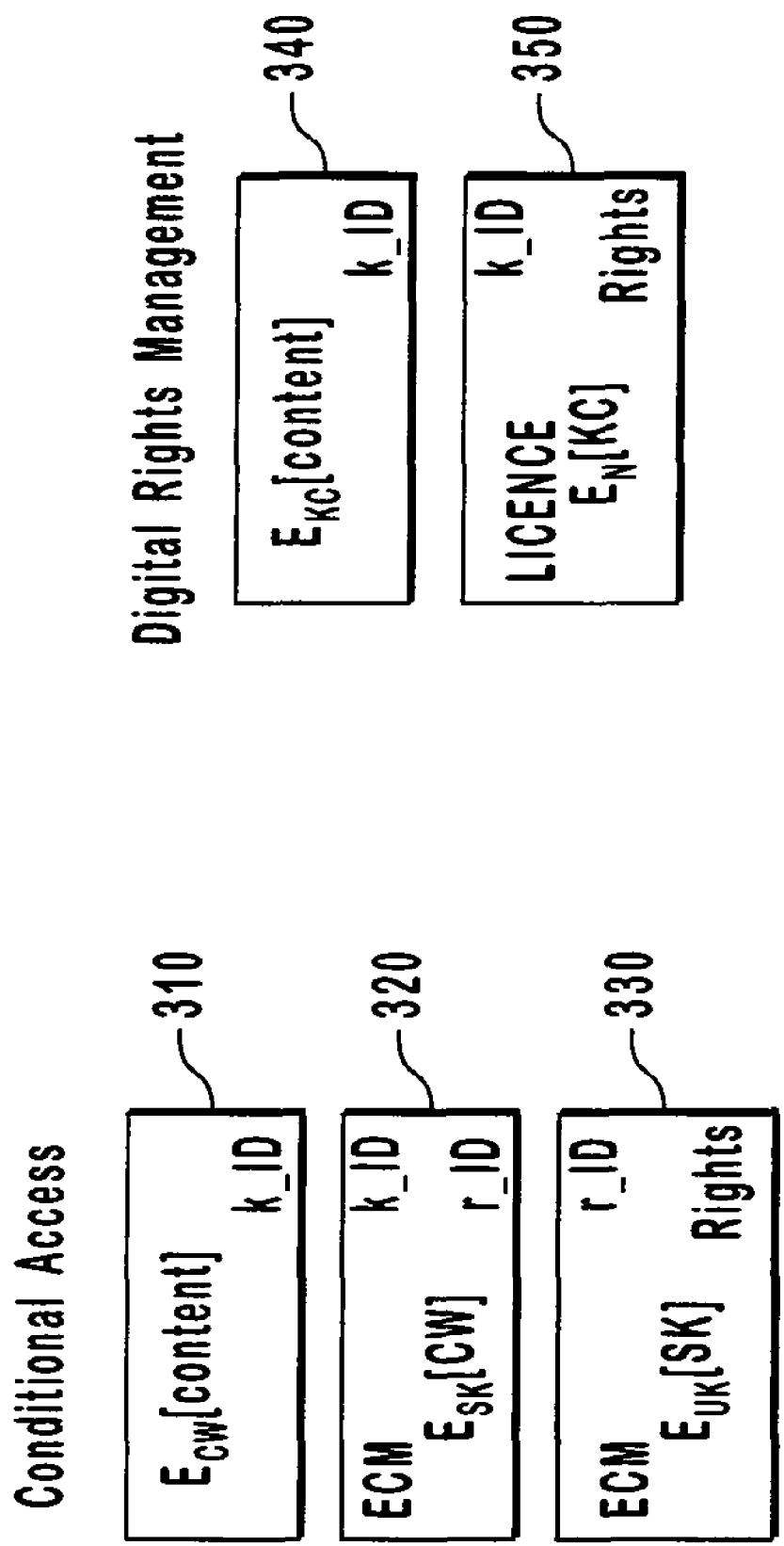
FIG. 3 illustrates a side-by-side comparison of conditional access packaging scheme to a digital rights management packaging scheme.

Based on the above description for CA and DRM systems, it is easily seen that the two systems employ different mechanisms for protecting content. FIG. 3 illustrates a side-by-side comparison of a CA packaging scheme with a DRM packaging system. One of the key differences to note between the CA and DRM systems is that a DRM system uses a single license, typically with a single encrypted key, to decrypt the content 340, whereas the CA system uses a multitude of intermittently updated keys to view or consume content. For example, a two hour movie encrypted in a DRM system will typically have one license 350 associated with the encrypted content 340, and will also typically have one encrypted key within the license 350, which is used to decrypt content 340.

The CA system, on the other hand, provides several layers of encryption and dynamically or continually changing encryption keys embedded within two different messaging mechanisms. In particular, the continually updated control words used to decrypt the content are encrypted using the service keys, which also periodically change, and which are embedded within the ECM 320. Further, the SK is encrypted using various user keys and included in the EMM 330. Accordingly, several SKs and possibly hundreds or thousands of CWs may be required in order to view or consume the same two hour movie for which a DRM system might only one license and one encryption key.

As previously mentioned, with the increasing popularity of home networking, there is an unmet need to relate CA protection systems to DRM protection systems. Accordingly, the present invention provides for methods, systems and computer program products for securely interfacing the CA and DRM systems and to transfer content protection information between the respective security kernels, while maintaining security of the content and any associated protection content information (e.g. usage rights, access conditions, encryption keys, etc.). The present invention provides for temporarily or permanently binding the respective CA and DRM security kernels, transcribing content protection information from the CA syntax to the DRM syntax, and potentially transcribing the protected content.

As will be recognized, there are many ways in which the transcription of the content protection information from conditional access to a digital rights management system can be achieved. For example, as shown in FIG. 3 in the side-by-side comparison of the CA packaging scheme with the DRM packaging system, the multitude of CWs used to encrypt content 310 in accordance with the CA method could be included and transcribed into license 350, thereby allowing license 350 to be used to decrypt the encoded conditional access content. Alternatively, or in addition, the license may include the service keys used to encrypt the CWs, thereby having an additional layer of protection within the license 350 when transcribing to the DRM system. As another example, encrypted content 310 could be decrypted using ECM 330 and ECM 320 in accordance with traditional CA methods, and a license 350 could then be generated and content encrypted using traditional DRM methods. In fact, any combination and number of possible mappings between the CA and DRM syntax is possible, and therefore the aforementioned and following examples for transcribing CA and DRM syntax is used for illustrative purposes only and is not meant to limit the scope of the present invention. Further, as described in greater detail below, the transcription of the content protection information from the CA syntax to the DRM syntax can occur in any one of a multitude of different devices, as well as at different times during the conversion process. Accordingly, the following implementation details are not meant to limit or otherwise narrow the scope of the present invention.

As previously mentioned, the present invention establishes a process for producing the content license used to consume content in accordance with usage rights defined by a content protection scheme, although the content originated from a different content protection scheme. Example embodiments provide for establishing a binding mechanism between the security kernels of a conditional access and digital rights management systems by authenticating the two security kernels when communicating. As will be described in greater detail below, for example with respect to FIGS. 4A-4L, the transfer of usage rights information and the transfer of the protected content may be implemented in any one of several different ways.

The binding functionality relies on secret information which can be stored in different ways. In the preferred embodiments, the binding information is stored in a trustworthy, unbreakable security device, e.g. a smart card or other security chip. Other example embodiments provide that the binding information may be stored in a secured library, ideally accessible only for reading from the security kernel of the DRM system. Alternatively, or in addition, the binding information may be stored in a secured file, available only to security kernels of the applications.

As will be appreciated, a number of realizations are possible for binding between the CA and DRM security kernels. For example, the security kernels may share a common secret and can secure exchange of information by encrypting the content using the secret. The secret could either be static (i.e., loaded in the kernel at installation time or individualization time), or dynamic (i.e., the secret could change over time using a software downloadable mechanism or an internal automated update process). The common secret could also be provisioned to the security kernels by the use of a public key cryptography and/or certificates.

Alternatively, the CA and DRM protection methods may have means to exchange certificates containing public key cryptography-based information. For example, the destination device kernel, i.e., the DRM system, could send its certificate to the receiving kernel, i.e., the CA kernel, when requesting information. The receiving kernel could then validate the certificate, and based upon the validity thereof, encrypt the requested information using the public key of the destination kernel and send the encrypted information. The destination device could then use its private key to retrieve the information. Of course, other means to mutually authenticate the kernels could be implemented, e.g. Dilfe-Hellman or other public key cryptography algorithms.

The binding duration between the two security kernels may be infinite or last for a specified duration. If the binding does not expire, (or in the case of long specified durations) the binding mechanisms may involve dynamic updates of the secrets used to exchange sensitive information, as discussed above. If the binding expires, either security kernels can trigger a new binding process, in a stand-alone way or through a trusted authority.

Provided successful authentication of the destination kernel, i.e., the DRM device, the change in binding information will automatically trigger both the receiving and destination kernels to use the new binding information in all subsequent exchange of sensitive information. Example embodiments provide that the receiving kernel may manage the binding mechanism for the destination kernel. This dynamic binding can use a higher level secret (symmetrical or asymmetrical), common to all security kernels capable of working with it, to send the new binding information to the destination device. The higher level secret should reside in a reputed unbreakable location, e.g. a smart card, an embedded chip or a tamper-proof location. The change of binding information can be programmed, or triggered at any time by the receiving device.

The trust between the two security kernels may be challenged at any time, independently of the receiving and destination security kernels. In such an event, the challenging kernel will ask the other kernel to send its binding-related information, e.g. a certificate. If the challenge is successful, sensitive information can be transmitted back and forth again, otherwise communication would be halted. The challenge-response can happen at a predetermined time, randomly chosen time, or triggered by either the receiving or destination security kernels, or never. A number of alternative challenge-response protocols can also be used to sporadically verify the authenticity of either security kernels.

Other example embodiments provide for a number of realizations for the transfer of usage rights or content protection information. For example, the receiving device (i.e., CA device) transfers the CPI to the destination device (i.e., DRM device), which will then generate the appropriate DRM content license either locally or using a remote server to which it connects. Another embodiment provides that the receiver is capable of generating the appropriate license in the format or syntax recognized by the destination device. The generation of the content license can be done locally or using a remote server to which the receiver connects. In yet another embodiment, the license associated with the DRM protection scheme is conveyed with the content received by the receiver or CA syntax device. For example, the DRM license could be transmitted via a private descriptor of a CA-protected (or non CA-protected) transport stream.

Similar to the variations in the transfer of content protection information, there are a number of realizations for the transfer of the protected content itself. For example, the protected content may be transmitted "as is" from the receiving device to the destination device. Alternatively, in accordance with example embodiments, the receiver or CA device decrypts the content and sends it to the destination device, compressed or uncompressed, which will subsequently encrypt the content in accordance with the DRM license and CPI. The communication channel between the CA device and the DRM device will typically be secured, e.g. by hardware or with a link protection mechanism, but this is not necessary. In any case, the DRM device should have means to securely generate the encryption key(s) and encrypt the content as well as update the CPI information within the content license to indicate the new encryption key set. Another example embodiment provides that the CA device sends the encrypted content to the DRM device, which decrypts the content using the CPI associated with the content and re-encrypts the content locally.

Other example embodiments provide that if the destination device or DRM device receives content that is not protected by the receiving device or CA device, but nonetheless carries CPI, then the DRM device may apply a default content protection policy closest to its interpretation of the CPI.

In still yet another embodiment, the receiving device transcripts the content (and possibly the license) into a link encryption mechanism, which will then be converted to the DRM mechanism. Typically, the content would remain encrypted with the keys used in the link encryption (and possibly the same keys as the ones used in the CA protection) and only the license would be transcripted from the link protection to the DRM protection.

FIGS. 4A-L, and the following description thereof, illustrates various implementations of how the content protection information may be used to create a DRM license and subsequently view CA protected content. The following illustrations and descriptions thereof are merely examples implementations of the above exemplary embodiments, and therefore are not meant to limit or otherwise narrow the scope of the present invention. Further, the following descriptions of FIGS. 4A-L refer to various devices for transcribing from CA to DRM when creating a DRM license and subsequently using the license to consume protected content. It should be recognized, however, that there are a number of different type of devices which could perform similar functions. For example, as described above, the receiver 410 or destination device 420 can be used to generate a DRM license. Alternatively, receiver 410 or destination device 420 may connect with a trusted remote device, which could also generate the DRM license. Moreover, the receiver or destination kernels could be anyone of a smart card, conditional access kernel, tamper proof chip, secure library, etc. As such, the following implementations are examples of using CA content protection information to generate a DRM license, however, the list is not to be interpreted as exhaustive.

FIG. 4A shows an example implementation in which a receiver 410 or CA secured device (CASD) receives conditional access messages (CAM) 405, i.e., ECM and EMM, along with protected content 425. As mentioned previously, receiver 410 may include any of a number of security devices such as a conditional access kernel (CAK), smart card kernel (SCK), or the like. Receiver 410 sends content protection information 415, as well as the received CA-protected content 425 to the destination device 420. The destination device will be a DRM system that includes a secure mechanism for generating DRM license 430 based upon the CPI 415. Destination device 420 will include a security kernel that may be in the form of a secure library or other similar dll capable of securely generating DRM license 430. The CA-protected content 425 could be left "as is," and as such, the DRM license 430 would include a list of keys similar to those provided in CAM 405. Alternatively, destination device 420 may decrypt the CA-protected content 425 and re-encrypt the content to produce a DRM-protected content 435 and update DRM license 430 with the appropriate usage rights interpreted from CPI 415 and the key(s) associated with protected content 435.

FIG. 4B illustrates another example implementation for generating a content license 430 in accordance with CPI 415 in a similar manner as that described above with regard to FIG. 4A. Receiver 410, herein shown as a conditional access kernel (CAK), receives CAM 405 and CA-protected content 425 from the corresponding network operator via satellite, cable or other terrestrial means. Of course, receiver 410, as previously mentioned, could be any number of CASD, e.g. smart card kernel. Receiver 410 sends CPI 415 to DRM destination device 420. In addition, receiver 410 decrypts the CA-protected content 425 using conventional CA scheme and the information provided within CAM 405. Accordingly, receiver 410 may send the unencrypted content 440 to the destination device or re-encrypt the content in accordance with the DRM scheme recognized by destination device 420 and send the encrypted content 435 to it 420. In any event, destination device 420 will produce a DRM license 430 and can encrypt the content 440 if received unencrypted or simply use the received encrypted content 435 and update the DRM license 430 with the appropriate keys.

FIG. 4C illustrates another example implementation for producing a content license 430 used to consume content 425, 435 in accordance with usage rights defined by CPI in a CA system. Again, receiver 410, which is a CASD, e.g. CAK, SCK, etc., receives CAM 405 and CA-protected content 425. In this implementation, however, receiver 410 is capable of producing or generating DRM license 430 and sending such license 430 to the destination DRM device 420. In this particular implementation, receiver 410 also sends CA-protected content 425 "as is" to the destination device 420. The destination device 420 may then decrypt the protected content 425, re-encrypt the content in accordance with DRM schemes to produce protected content 435 and update the DRM license 430 with the appropriate content protection key(s). Alternatively, receiver 410 could have included the appropriate keys (e.g. a list of CWs) in DRM license 430 when sent to destination device 420, such that destination device 420 can use the DRM license 430 to decrypt the CA-protected content 425 in it's original form. Another example embodiment provides that the destination device 420, or of course some remote device not shown, can update the content license 430 with the appropriate CA keys in order to consume the CA-protected content 425.

In yet another example implementation, shown in FIG. 4D, receiver 410, shown here as SCK, receives the CAM 405 and protected content 425, decrypts the CA-protected content 425 and re-encrypts the content in accordance with the DRM scheme to produce encrypted content 435a. Further, receiver 410 also uses CPI to produce the DRM content license #1 (430a). DRM license #1 (430a) and protected content 435a can then be sent to the destination device 420. Thereafter, the destination device 420 can use DRM license #1 (430a) to consume the re-encrypted content 435a, or can use the usage rights information within the DRM license #1 (430a) to produce a second DRM license #2 (430b) and further decrypt the original re-encrypted content 435a and produce another encrypted version 435b to which license #2 (430b) is associated.

Figure 4E:
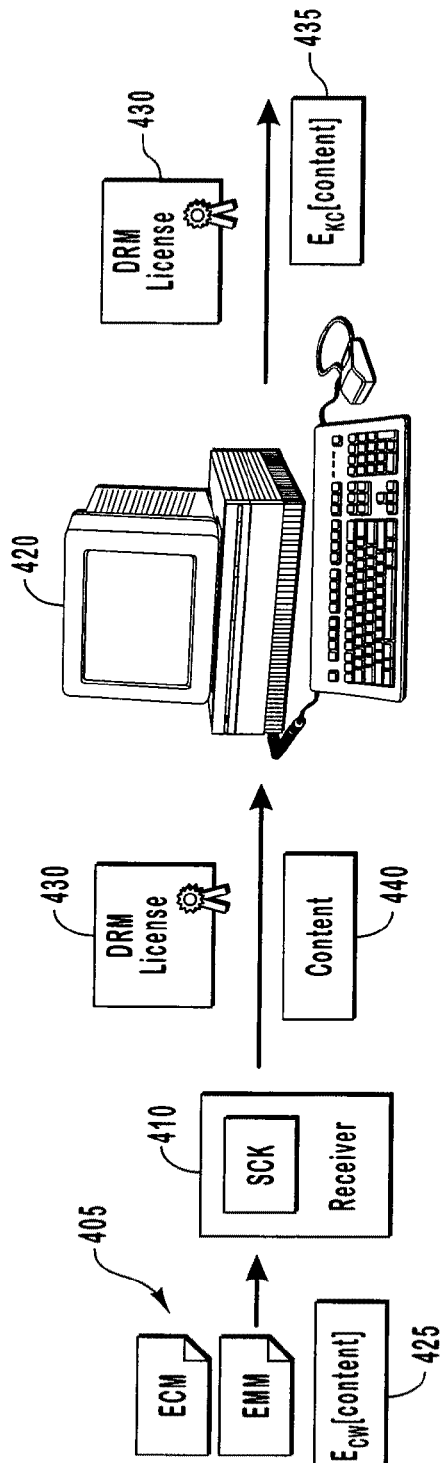

FIG. 4E illustrates another example implementation, wherein receiver 410 receives CA information 405 and protected content 425. Receiver 410 uses a secure kernel, shown here as CAK, and CPI to produce DRM license 430. In addition, this example implementation shows receiver 410 decrypting the content to produce content 440, which can then be sent along with the DRM license 430 to the destination device 420. Thereafter, the destination device 420 encrypts content 440 to produce encrypted content 435 and updates the received DRM license 430 with the appropriate encryption key(s).

Figure 4F:
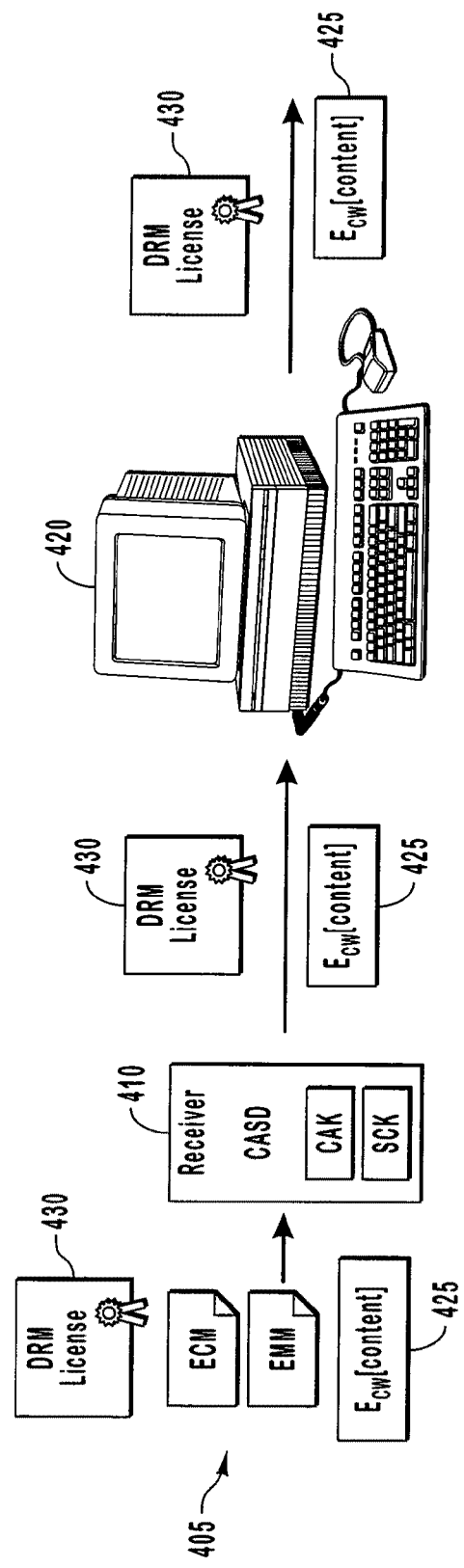

FIG. 4F illustrates yet another example embodiment and implementation, wherein receiver 410 receives not only the CAM 405 and CA-encrypted content 425, but also receives a DRM license 430 over the transport stream, or parallel with, from a network operator or other trusted source. This license 430 may be received before, after or during the receipt of the protected content 425. The DRM license 430, however, should somehow be linked to the content. For example, the content may be linked to the DRM license 430 by a common identifier associated with both. Alternatively, the two may be linked by a bridging mechanism or message, e.g., CAM 405, which has identifiers for both the license 430 and the content 425. In any event, once received, receiver 410 passes the DRM license 430 and the protected content 425 to the destination device 420. In this example embodiment, destination device 420 can use the DRM license 430 to consume the conditional access-protected content 425 in its original form.

In another embodiment, the CAM 405 may be received at the receiver 410 and delivered to the destination device 420. In such case, the destination device will supply the CAM 405 to a DRM license server or service (not shown), which can then generate, and send back to the destination device 420, the DRM license 430 (in accordance with the usage rights defined). The DRM license 430 may be used in decrypting either the conditional access content 425 or protected content subsequently created based on the conditional access content and usage rights when generating the DRM license in the DRM service. The DRM license 430 (and the protected content) may be distributed to the destination device 420 either directly or indirectly through any of the possible ways described herein.

FIG. 4G shows an alternative to the above-illustrated receipt of a DRM license via a transport stream. In this embodiment, receiver 410 receives ECM and EMM 405, CA-protected content 425 and a first DRM license 430a over the transport stream, which it then forwards to destination device 420. Thereafter, destination device uses its secure kernel and the first DRM license 430a to decrypt CA-protected content 425. This unencrypted content can then be re-encrypted to produce encrypted content 435. In addition, CPI from the first DRM license 430a can be used to produce a second DRM license 430b, which will include at least the usage rights from the first DRM license 430a. Further, the second DRM license 430b can be updated with the appropriate encryption key(s).

FIG. 4H illustrates a similar example implementation as that described above with regard to FIG. 4G; however, receiver 410 decrypts CA-protected content 425 to produce unencrypted content 440, which it then sends along with the first DRM license 430a to destination device 420. Thereafter, destination device 420 produces encrypted content 435 and also creates a second DRM license 430b with the corresponding updated key(s).

Figure 4I:
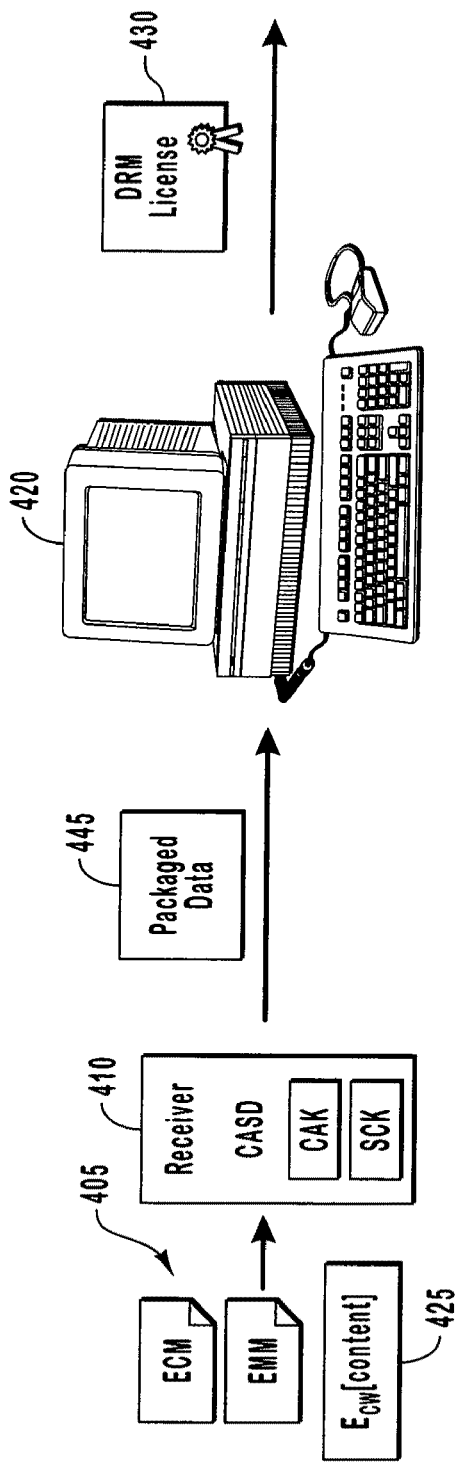

In yet another example embodiment and implementation, FIG. 4I illustrates how the CA information can be packaged and sent to destination device 420. In this example implementation and embodiment, receiver 410 receives CAM 405 and protected content 425, which it packages as package data 445, which is then sent to destination device 420. The packaged data may include, for example, CPI information and other information understood by the destination device 420 sufficient to produce the appropriate DRM license 430.

Figure 4J:
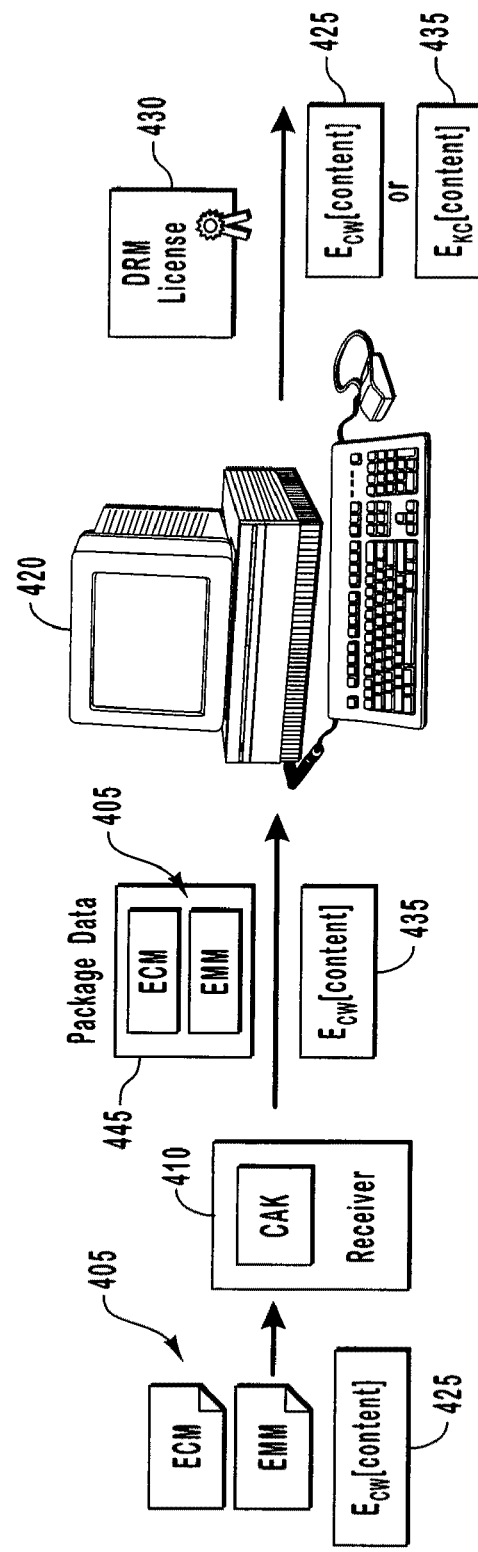

The following illustrates how the destination device 420 may use the package data 445 to produce the appropriate DRM content license 430 and subsequently consume content 425, 435. For example, as shown in FIG. 4J, destination device 420 receives package data 445 that includes, among other data, ECM and EMM 405. The CA-protected content 435 can also be sent to the destination device 420 by receiver 410. Thereafter, destination device 420 uses CPI information, sent in the package data 445, or received from a remote source (not shown), or otherwise known to the destination device 420, to produce content license 430. Further, destination device 420 can either update DRM content license 430 with the CW keys used for decrypting CA-protected content 425, or in the alternative can decrypt protected content 425 and re-encrypt using DRM keys to produce encrypted content 435 and update DRM license 430 accordingly.

FIG. 4K illustrates another example of receiver 410 packaging data 445, which includes the CAM 405 and the CA-protected content 425, among other information. Destination device 420 understands how to deal with the package data 445 and can use this and other information, such as CPI, to produce DRM license 430 and the appropriate DRM-protected content 435. Similarly, FIG. 4L illustrates how the conditional access secured device 410 receives the appropriate ECM and EMM 405 and CA-protected content 425 to produce package data 445 that includes the appropriate CPI 415 and CA-protected content 425 and sends this to destination device 420, which can then produce the appropriate content license 430 and subsequently consume content in accordance with various methods as aforementioned.

The present invention may also be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

FIG. 5 illustrates example steps and acts used to produce a content license for consuming content in accordance with usage rights defined by a content protection scheme, although the content originated from a different content protection scheme. As shown, conditional access-protected content and content protection information are received in acts 510 and 520, respectively. The conditional access-protected content is broadcast to a plurality of receivers and encrypted by a plurality of intermittent updated keys. Further, the content protection information includes information used to determine, manage and enforce usage rights associated with the conditional access-protected content.

Also shown in FIG. 5, a step for determining 535 usage rights may include the acts of interpreting 530 CA content protection information. The usage rights are defined by a content provider, and specify how and under what conditions content may be consumed at a destination device.

A step for providing 545 digital rights management keys may include the act of producing 540 a content license used for enforcing digital rights within the destination device. Of course, information within the license is based upon the interpreted conditional access content protection information and in accordance with usage rights.

As previously mentioned, the two security kernels, that is the receiving device and destination device, may be bound through secret information which may be stored in various ways. As such, the aforementioned steps and acts may also include an act of authenticating that the destination device is a trusted device for establishing a secure communication channel between a receiver of the conditional access protected content and the destination device. In addition, as described above, the location of where the content protection information is interpreted and received, and where the content license is produced can vary in accordance with any one or more of the aforementioned implementations.

In accordance with other exemplary embodiments of the present invention, and as illustrated in FIG. 6, a method of consuming protected content using a license that defines usage rights within a content protection scheme different from the originating protection scheme is available. The process receives 610 conditional access-protected content broadcast to a plurality of receivers and encrypted by a plurality of intermittent updated keys. Further, the act of receiving 620 a digital rights license that includes information that specifies how and under what conditions the conditional access-protected content may be consumed at a destination device is performed. The digital rights license also includes at least a portion of the plurality of intermittent updated keys. Finally, the digital rights license may be used 630 for decrypting the conditional access-protected content at a destination device that uses a digital rights protection scheme to consume content.

The destination device may subsequently encrypt the decrypted conditional access-protected content using one or more digital rights management keys in accordance with usage rights, which define how and under what conditions content may be consumed at the destination device. Other example embodiments provide the usage rights are at default value defined in a secure device within the receiving device.

Alternatively, the usage rights could be a default value defined in a secure library within the destination device. Further, the usage rights could be a default value defined within a device separate from the receiving device and the destination device.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724 or RAM 725, including an operating system 35, one or more application programs 36, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of producing a content license used to consume content in accordance with usage rights defined by a content protection scheme, although the content originated from a different content protection scheme, the method comprising:
   receiving conditional access protected content;
   receiving conditional access content protection information associated with the conditional access protected content;
   interpreting the conditional access content protection information and determining usage rights of a destination device as defined by a content provider;
   based on the interpreted content protection information, producing a content license used for enforcing digital rights within the destination device by using one or more digital rights management keys in accordance with the usage rights; and
   encrypting the consumable content using the one or more digital rights management keys, wherein the one or more digital rights management keys are not included within the consumable content, and wherein encrypting the consumable content using the one or more digital rights management keys converts the conditional access protected content to digital rights management (DRM) protected content.

2. The method of claim 1, wherein the protected content is conditional access protected content that is encrypted by a plurality of intermittent updated keys, and wherein the method further includes:
   decrypting the conditional access protected content using the intermittent updated keys, wherein decrypting the conditional access protected content is performed prior to encrypting the consumable content using the one or more digital rights management keys.

3. The method of claim 1, wherein the conditional access content protection information includes a specification provided by the content provider of how and under what conditions the protected content may be consumed at the destination device.

4. The method of claim 1, further including:
   authenticating that the destination device is a trusted device for establishing a secure communication channel between a receiver of the conditional access protected content and the destination device.

5. The method of claim 4, wherein the receiver is a conditional access secure device that sends the conditional access content protection information and the conditional access protected content to the destination device, and wherein the destination device is programmed to interpret the conditional access content protection information and produce the content license.

6. The method of claim 4, wherein the receiver decrypts the conditional access protected content using the plurality of intermittent updated keys to produce consumable content and further sends the conditional access content protection information to the destination device, which then interprets the conditional access content protection information and produces the content license.

7. The method of claim 6, wherein the receiver encrypts the consumable content using the one or more digital rights management keys and sends the encrypted consumable content to the destination device.

8. The method of claim 6, wherein the receiver is at least one of a smart card or a secured chip, and wherein the destination device includes secured library software programmed to interpret the conditional access content protection information.

9. The method of claim 6, wherein the receiver includes a secured library accessible only for reading from a security kernel of a digital rights management (DRM) system.

10. The method of claim 1, wherein the one or more digital rights management keys includes at least a portion of the plurality of intermittent updated keys.

11. The method of claim 1 wherein a receiver decrypts the conditional access protected content using a plurality of intermittent updated keys to produce consumable content and sends the conditional access content protection information to the destination device, which sends the content protection information and a request for the content license to a license server that interprets the conditional access content protection information and produces the content license.

12. The method of claim 1 wherein a receiver produces the content license and sends the content license and the conditional access protected content to the destination device.

13. The method of claim 12, wherein the destination device decrypts the content protection information using a plurality of intermittent updated keys to produce consumable content, and then encrypts the conditional access consumable content using the one or more digital rights management keys.

14. The method of claim 12, wherein the receiver is within the destination device.

15. A computer program product comprising one or more computer readable storage media having stored thereon computer executable instructions that, when executed by a processor, implement a method of producing a content license used to consume content in accordance with usage rights defined by a content protection scheme, although the content originated from a different content protection scheme, the method comprising:
   receiving conditional access protected content;
   receiving conditional access content protection information associated with the conditional access protected content;
   interpreting the conditional access content protection information and determining usage rights of a destination device as defined by a content provider;
   based on the interpreted content protection information, producing a content license used for enforcing digital rights within the destination device by using one or more digital rights management keys in accordance with the usage rights; and
   encrypting the consumable content using the one or more digital rights management keys, wherein the one or more digital rights management keys are not included within the consumable content, and wherein encrypting the consumable content using the one or more digital rights management keys converts the conditional access protected content to digital rights management (DRM) protected content.

16. The computer program product of claim 15, further including:
establishing a secure communication channel between a receiver of the conditional access protected content and the destination device.

17. The computer program product of claim 16, wherein the receiver decrypts the conditional access protected content using a plurality of intermittent updated keys to produce consumable content prior to encrypting the consumable content, interprets the conditional access content protection information to produce the content license, and sends the content license and consumable content to the destination device, and wherein the destination device includes programming to, upon receipt of the consumable content, encrypt the consumable content using the one or more digital rights management keys.

18. The computer program product of claim 16, wherein the receiver decrypts the conditional access protected content using a plurality of intermittent updated keys to produce consumable content, sends the conditional access content protection information to a content license server, receives the content license from the content server, and sends the content license and consumable content to the destination device, and wherein the destination device includes programming to, upon receipt of the consumable content, encrypt the consumable content using the one or more digital rights management keys.

19. The computer program product of claim 18, wherein the encrypted content and content license are stored in a storage device for future use when consuming the consumable content.

20. An entertainment media environment for producing a content license used to consume content in accordance with usage rights defined by a content protection scheme, although the content originated from a different content protection scheme, comprising:
a destination device configured to consume consumable content;
a dedicated set-top box receiver device in communication with the destination device and dedicated to receive conditional access protected content information broadcast to a plurality of set-top box receiver devices; and
one or more computer-readable storage media on one or both of the destination device or the dedicated set-top box receiver, the one or more computer-readable storage media having computer-readable instructions that, when executed by a processor, cause one or both of the destination device and dedicated set-top box receiver to perform the method recited in claim 1.

* * * * *

UNITED STATES PATENT AND TRADEMARK OFFICE
CERTIFICATE OF CORRECTION

PATENT NO.         : 7,757,299 B2
APPLICATION NO.    : 12/343210
DATED              : July 13, 2010
INVENTOR(S)        : Arnaud Robert et al.

It is certified that error appears in the above-identified patent and that said Letters Patent is hereby corrected as shown below:

In column 16, line 24, in Claim 11, delete "claim 1" and insert -- claim 1, --, therefor.

In column 16, line 32, in Claim 12, delete "claim 1" and insert -- claim 1, --, therefor.

Signed and Sealed this
Fifteenth Day of February, 2011

David J. Kappos
*Director of the United States Patent and Trademark Office*